United States Patent
Singh et al.

(10) Patent No.: US 8,179,805 B2
(45) Date of Patent: May 15, 2012

(54) METHOD AND SYSTEM FOR WIRELESS COMMUNICATION BY SPATIAL REUSE

(75) Inventors: Harkirat Singh, Santa Clara, CA (US);
Huai-Rong Shao, Santa Clara, CA (US);
Xiangping Qin, San Jose, CA (US);
Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 888 days.

(21) Appl. No.: 12/014,705

(22) Filed: Jan. 15, 2008

(65) Prior Publication Data
US 2008/0175198 A1    Jul. 24, 2008

Related U.S. Application Data

(60) Provisional application No. 60/881,444, filed on Jan. 19, 2007.

(51) Int. Cl.
*H04B 7/00* (2006.01)
(52) U.S. Cl. ........................ 370/242; 370/332
(58) Field of Classification Search .......... 370/332
See application file for complete search history.

(56) References Cited

U.S. PATENT DOCUMENTS

| | | | |
|---|---|---|---|
| 5,613,200 A | 3/1997 | Hamabe | |
| 5,819,182 A | 10/1998 | Gardner et al. | |
| 5,963,852 A | 10/1999 | Schlang et al. | |
| 6,330,459 B1 * | 12/2001 | Crichton et al. | 455/562.1 |
| 6,526,036 B1 | 2/2003 | Uchida et al. | |
| 6,853,629 B2 * | 2/2005 | Alamouti et al. | 370/330 |
| 6,980,839 B2 | 12/2005 | DaCosta | |
| 7,079,509 B2 | 7/2006 | Belcea | |
| 7,085,572 B2 * | 8/2006 | Ishida | 455/450 |
| 7,099,689 B2 | 8/2006 | Bahl et al. | |
| 7,103,344 B2 | 9/2006 | Menard | |

(Continued)

FOREIGN PATENT DOCUMENTS

KR    1020020038823 A    5/2002

(Continued)

OTHER PUBLICATIONS

International Search Report for International Application No. PCT/KR2008/000326 dated Apr. 28, 2008.

(Continued)

*Primary Examiner* — Chirag Shah
*Assistant Examiner* — Jay P Patel
(74) *Attorney, Agent, or Firm* — Kenneth L. Sherman, Esq.; Michael Zarrabian, Esq.; Sherman & Zarrabian LLP

(57) ABSTRACT

Wireless communication between a first transmitter and a first receiver for a new transmission is established on the same wireless data channel used for ongoing transmission between a second transmitter and a second receiver. This is achieved by determining if the second receiver can receive signals from the first transmitter, and determining if the first receiver can receive signals from the second transmitter. If the second receiver cannot receive signals from the first transmitter, and the first receiver cannot receive signals from the second transmitter, then a new transmission is performed from the first transmitter to the first receiver by spatial reuse of the wireless data channel at least partially concurrently with the ongoing transmission on the data channel.

33 Claims, 12 Drawing Sheets

U.S. PATENT DOCUMENTS

| | | | |
|---|---|---|---|
| 7,120,392 | B2 | 10/2006 | Chu et al. |
| 7,126,927 | B2 | 10/2006 | Heijenk |
| 7,155,264 | B2 | 12/2006 | Twitchell |
| 7,190,961 | B2 | 3/2007 | Burr |
| 7,209,771 | B2 | 4/2007 | Twitchell |
| 7,221,667 | B2 | 5/2007 | Hori et al. |
| 7,227,851 | B1 | 6/2007 | Gopalakrishnan et al. |
| 7,272,134 | B2 | 9/2007 | Iwama et al. |
| 7,359,733 | B2 * | 4/2008 | Liang et al. ............... 455/562.1 |
| 7,519,034 | B2 | 4/2009 | So et al. |
| 7,519,399 | B2 | 4/2009 | Suzuki |
| 7,565,149 | B2 | 7/2009 | Saffre et al. |
| 7,570,972 | B2 | 8/2009 | Pirzada et al. |
| 7,596,367 | B2 | 9/2009 | Kawasaki |
| 7,613,156 | B2 | 11/2009 | Rittle et al. |
| 7,653,163 | B2 | 1/2010 | Sadri et al. |
| 7,688,799 | B2 | 3/2010 | Yamamoto |
| 7,724,656 | B2 | 5/2010 | Sagfors et al. |
| 7,742,788 | B2 | 6/2010 | Frank |
| 7,792,066 | B2 | 9/2010 | Fujii et al. |
| 7,809,835 | B2 | 10/2010 | Reunamaki et al. |
| 7,822,440 | B2 * | 10/2010 | Park et al. ..................... 455/561 |
| 7,826,471 | B2 | 11/2010 | Wilson et al. |
| 7,843,819 | B1 | 11/2010 | Benveniste |
| 7,844,298 | B2 | 11/2010 | Riley |
| 7,949,358 | B2 | 5/2011 | Wentink et al. |
| 7,957,777 | B1 | 6/2011 | Vu et al. |
| 8,027,282 | B2 | 9/2011 | Boehnke et al. |
| 2004/0002357 | A1 | 1/2004 | Benveniste |
| 2004/0064309 | A1 | 4/2004 | Kosai |
| 2006/0040671 | A1 | 2/2006 | Takarabe |
| 2006/0045035 | A1 | 3/2006 | Liu |
| 2006/0194564 | A1 | 8/2006 | Hokimoto et al. |
| 2006/0198353 | A1 | 9/2006 | Wason et al. |
| 2006/0209772 | A1 | 9/2006 | Fang et al. |
| 2006/0251256 | A1 | 11/2006 | Asokan et al. |
| 2006/0268802 | A1 | 11/2006 | Faccin |
| 2007/0253391 | A1 | 11/2007 | Shao et al. |
| 2007/0268972 | A1 | 11/2007 | Kim |
| 2008/0002652 | A1 | 1/2008 | Gupta et al. |
| 2008/0005219 | A1 * | 1/2008 | Nabar et al. ................. 709/201 |
| 2008/0031208 | A1 | 2/2008 | Abhishek et al. |
| 2008/0039046 | A1 * | 2/2008 | Vilzmann et al. ............ 455/296 |
| 2008/0056390 | A1 | 3/2008 | Rainbolt |
| 2008/0130617 | A1 | 6/2008 | Singh et al. |
| 2008/0175197 | A1 | 7/2008 | Shao et al. |
| 2008/0175199 | A1 | 7/2008 | Shao et al. |
| 2008/0176521 | A1 | 7/2008 | Singh et al. |
| 2008/0176561 | A1 | 7/2008 | Shao et al. |
| 2008/0177886 | A1 | 7/2008 | Singh et al. |
| 2009/0111532 | A1 * | 4/2009 | Salokannel et al. .......... 455/574 |
| 2009/0185489 | A1 | 7/2009 | Ruffini et al. |
| 2011/0002243 | A1 * | 1/2011 | Sherman et al. ............. 370/280 |

FOREIGN PATENT DOCUMENTS

| | | |
|---|---|---|
| KR | 10-2004-0069516 A | 8/2004 |
| WO | 02/067459 A1 | 8/2002 |

OTHER PUBLICATIONS

Notification of Transmittal of the International Search Authority, Written Opinion for International Application No. PCT/KR2008/000317 dated Apr. 29, 2008, 10 pages.

Notification of Transmittal of the International Search Authority, Written Opinion for International Application No. PCT/KR2008/000319 dated May 6, 2008, 10 pages.

Shih, E. et al., "Wake on Wireless: An Event Driven Energy Saving Strategy for Battery Operated Devices," Proceedings of the 8th Annual ACM Conference on Mobile Computing and Networking, Sep. 2002, http://www.sigmobile.org/mobicom/2002/papers/p053-shih.pdf, Atlanta, GA, USA.

Notification of Transmittal of the International Search Authority, International Search Report and Written Opinion dated Apr. 29, 2008 for International Application No. PCT/KR2008/000316, filed Jan. 18, 2008, pp. 1-11, Seo-gu, Daejeon, Republic of Korea.

Notification of Transmittal of the International Search Authority, International Search Report and Written Opinion dated May 6, 2008 for International Application No. PCT/KR2008/000318, filed Jan. 18, 2008, pp. 1-9, Seo-gu, Daejeon, Republic of Korea.

Notification of Transmittal of the International Search Authority, International Search Report and Written Opinion dated May 6, 2008 for International Application No. PCT/KR2008/000323, filed Jan. 18, 2008, pp. 1-10, Seo-gu, Daejeon, Republic of Korea.

Hitachi, LTD. et al., "High-Definition Multimedia Interface Specification, Version 1.2," HDMI Licensing, LLC., Aug. 22, 2005, pp. 1-214, United States.

IEEE Computer Society, "802.15.3™ IEEE Standard for Information Technology—Telecommunications and Information Exchange Between Systems—Local and Metropolitan Area Networks—Specific Requirements, Part 15.3: Wireless Medium Access Control (MAC) and Physical Layer (PHY) Specifications for High Rate Wireless Personal Area Networks (WPANs)," IEEE, Sep. 29, 2003, pp. 1-324, New York, United States.

Multiband OFDM Alliance Special Interest Group (MBOA-SIG) et al., "Distributed Medium Access Control (MAC) for Wireless Networks, Draft 0.99," MBOA-SIG and WiMedia Alliance, Inc., Nov. 1, 2005, pp. i-176, United States.

U.S. Non-final Office Action for U.S. Appl. No. 12/014,709 mailed Dec. 21, 2010.

ECMA International, "High Rate Ultra Wideband PHY and MAC Standard," Standard ECMA-368, 1st Edition, Dec. 2005, pp. i-312, ECMA International, Geneva, Switzerland.

Cidon, I. et al., "Fast Connection Establishment in High Speed Networks," Proceedings of the ACM Symposium on Communication Architectures & Protocols (SIGCOMM '90), 1990, pp. 287-296, ACM, United States.

Crutcher, L.A. et al., "Connection Management for an ATM Network," IEEE Network, Nov. 1992, pp. 42-55, vol. 6, No. 6, IEEE, United States.

Clark, D.D. et al., "An Analysis of TCP Processing Overhead," IEEE Communications Magazine, Jun. 1989, pp. 23-29, vol. 27, No. 6, IEEE, United States.

Lindgren, P. et al., "Fast Connection Establishment in the DTM Gigabit Network," Proceedings of the IFIP TC6/WG6.4 Fifth International Conference on High Performance Networking V, 1994, pp. 283-294, North-Holland Publishing Company Amsterdam, The Netherlands.

Korean Non-Final Office Action dated Mar. 8, 2010 for Korean Patent Application No. 10-2008-7009721, filed on Apr. 23, 2008, pp. 1-5, Korean Intellectual Property Office, Seo-gu, Daejeon, Republic of Korea (English translation attached, pp. 1-4).

Korean Final Office Action dated Aug. 31, 2010 for Korean Patent Application No. 10-2008-7009721, filed on Apr. 23, 2008, pp. 1-2, Korean Intellectual Property Office, Seo-gu, Daejeon, Republic of Korea (English translation attached, p. 1).

Korean Non-Final Office Action dated Sep. 17, 2009 for Korean Patent Application No. 10-2008-7008114, filed on Apr. 3, 2008, pp. 1-3, Korean Intellectual Property Office, Seo-gu, Daejeon, Republic of Korea (English translation attached, pp. 1-2).

Korean Final Office Action dated Nov. 20, 2009 for Korean Patent Application No. 10-2008-7008114, filed on Apr. 3, 2008, pp. 1-2, Korean Intellectual Property Office, Seo-gu, Daejeon, Republic of Korea (English translation attached, p. 1).

Wirelesshd, LLC, "WirelessHD Specification Revision 0.1," WirelessHD, LLC, Jul. 12, 2006, pp. i-167, United States.

Wirelesshd, LLC, "WirelessHD Specification, Revision 0.2 Draft 1," WirelessHD, LLC, Jul. 12, 2006, pp. i-221, United States.

* cited by examiner

METHOD AND SYSTEM FOR WIRELESS COMMUNICATION BY SPATIAL REUSE

RELATED APPLICATION

This application claims priority from U.S. Provisional Patent Application Ser. No. 60/881,444, filed on Jan. 19, 2007, incorporated herein by reference.

FIELD OF THE INVENTION

The present invention relates to wireless communication, and in particular to wireless communication by channel reuse.

BACKGROUND OF THE INVENTION

With the proliferation of wireless communications, many wireless stations are in use in wireless networks. Such wireless stations can communicate over channels in infrastructure mode, ad hoc mode or other modes. In infrastructure mode, a wireless coordinator provides a coordination function by forwarding data and control messages for the wireless stations, enabling the wireless stations to establish connections with each other via communication links through the coordinator. A station can transmit an information request to the coordinator to obtain the information about other stations within a communication system such as a wireless network. Wireless stations can periodically receive control messages such as beacons from the coordinator, wherein the beacons indicate channel reservation and occupation information, allowing the stations to reserve a data channel based on such information.

In ad hoc mode communication, a coordinator is not required. A pair of wireless stations directly establish a connection without association to a coordinator. Establishing such a connection is achieved by signaling to reserve a data channel. Signaling includes communicating control messages, such as control messages, ad hoc beacons, etc. over a default control channel between the pair of stations.

Both in infrastructure mode and ad hoc mode communication, when connections between wireless stations need to be established it is desirable to utilize wireless data channel bandwidth efficiently.

BRIEF SUMMARY OF THE INVENTION

The present invention provides a method and a system for wireless communication between wireless stations by spatial reuse. One embodiment involves establishing wireless communication between a first transmitter and a first receiver on the same wireless data channel used for ongoing transmission between a second transmitter and a second receiver. Establishing wireless communication between the first transmitter and the first receiver includes determining if the second receiver can receive signals from the first transmitter, and determining if the first receiver can receive signals from the second transmitter.

If the second receiver cannot receive signals from the first transmitter, and the first receiver cannot receive signals from the second transmitter, then a new transmission is performed from the first transmitter to the first receiver by spatial reuse of the wireless data channel, wherein both the first transmitter and the second transmitter can concurrently transmit on the data channel. The new transmission on said data channel is at least partially concurrent with said ongoing transmission on said data channel.

These and other features, aspects and advantages of the present invention will become understood with reference to the following description, appended claims and accompanying figures.

BRIEF DESCRIPTION OF THE DRAWINGS

In the drawings, like references refer to similar elements.

DETAILED DESCRIPTION OF THE INVENTION

The present invention provides a method and system for wireless communication between wireless stations by spatial reuse. One embodiment involves reusing data channels for at least partially concurrent communications between pairs of wireless stations. A new transmission between a pair of wireless stations utilizes the same data channel used in an ongoing transmission between another pair of wireless stations.

Figure 1:
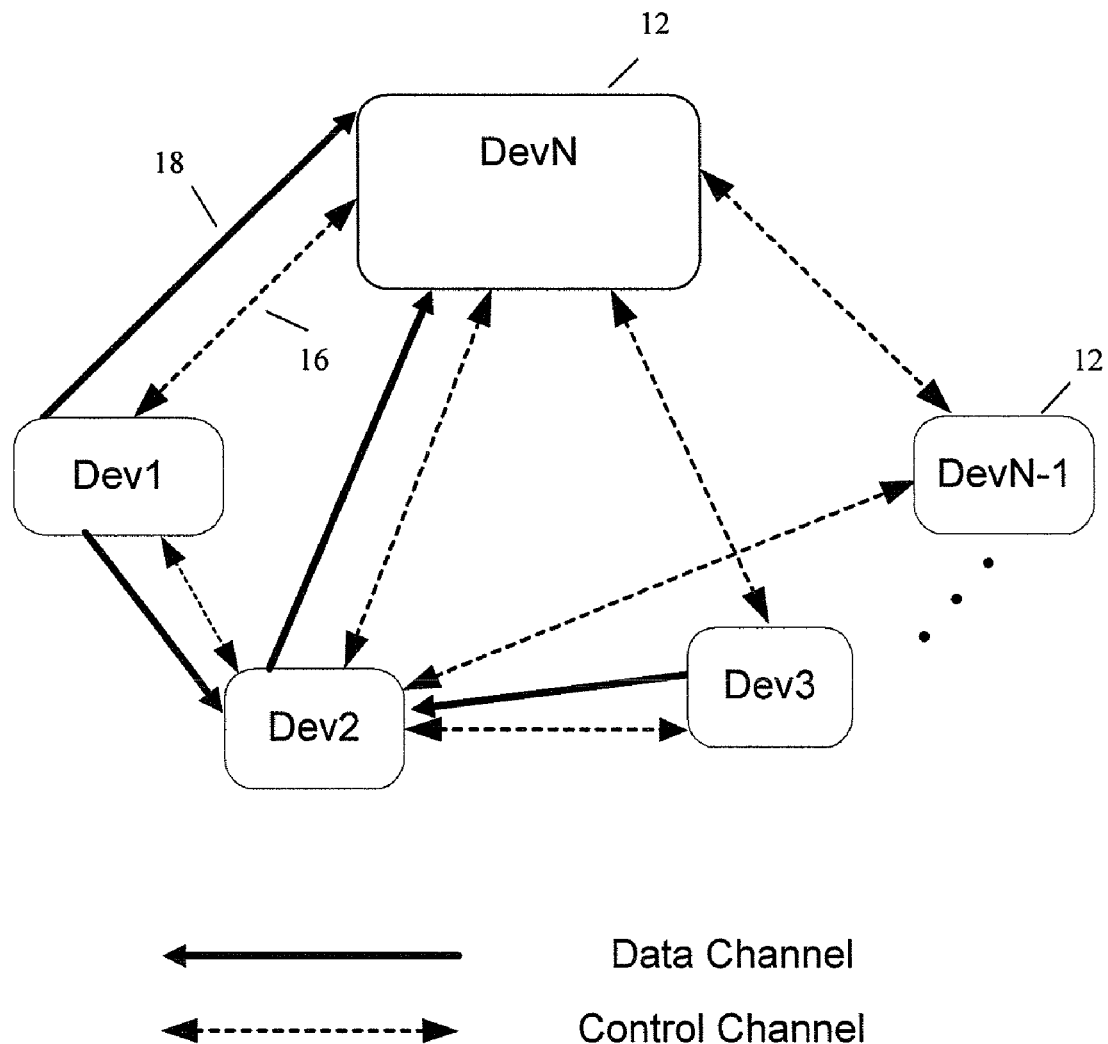
FIG. 1 shows a functional block diagram of a wireless network implementing wireless communication, according to an embodiment of the present invention.

FIG. 1 shows a functional block diagram of a wireless network 10 that may implement wireless communication between N wireless stations 12 (e.g., devices Dev1, . . . , DevN) on a 60 GHz, according to an embodiment of the present invention. A control channel 16 is used for control message transmissions to coordinate the transmissions on a data channel 18. Each of the stations 12 can function as an initiator or a responder, wherein a transmission initiator is a station that first initiates transmission and can be a transmission sender or receiver. A transmission responder is a station that responds to the transmission initiator and can be a transmission sender or receiver. The communication protocol can be an infrastructure mode or an ad hoc mode communication protocol.

A frame structure may be used for data transmission between wireless stations. Frame aggregation can be used in a Media Access Control (MAC) layer and a physical (PHY) layer. The MAC layer obtains a MAC Service Data Unit (MSDU) and attaches a MAC header thereto, in order to construct a MAC Protocol Data Unit (MPDU), for transmission. The MAC header includes information such as a source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. Before transmission as a packet from a transmitter to a receiver, a preamble is attached to the PPDU, wherein the preamble can include channel estimation and synchronization information.

At higher frequency bands such as 60 GHz there is much more free space loss than at lower frequencies such as 2 GHz or 5 GHz because free space loss increases quadratically with frequency increases. This higher free space loss can be compensated for, using multiple antennas with more pattern directivity, while maintaining small antenna pattern dimensions, known as beamforming. When beamforming is used, antenna obstruction (e.g., by an object) and mis-pointing, may easily cause a substantial drop in received transmission power. This may nullify the advantage of using multiple antennas. Therefore, dynamic beamsearching and beamtracking are used to maintain stable beamforming transmission. Beamtracking involves monitoring the quality of beamformed transmission on a beamforming channel, while beamsearching involves searching for new beamforming coefficients to provide satisfactory channel quality. At higher frequencies such as 60 GHz transmissions, directional antennas can be used, wherein one or more directional antennas at a sender can physically point to a receiver to compensate for higher free space loss. Usually there is no dynamic beamsearching when directional antennas are used.

In the example network 10 shown in FIG. 1, the stations 12 operate in ad hoc transmission mode. However, in infrastructure mode, a coordinator (e.g., DevN) may manage the stations within the transmission coverage/range of one another. In ad hoc mode, the control channel 16 is omni-directional and the data channel 18 (e.g., 60 GHz) is directional. In one example, the control channel 16 can use different technologies such as Bluetooth, WLAN, other wireless technologies such as UWB, or even another different 60 GHz channel (e.g., same bandwidth or narrower than the data channel 18). The control channel 16 has the same coverage/range as the data channel 18. The data channel 18 is an asymmetric channel (e.g., a 60 GHz data transmission is for one-way transmission only). The control channel 16 is a symmetric channel and supports a half-duplex mode.

The data channel selection (e.g., determining which 60 GHz data channel to use) for data communication between two stations (wireless devices) is determined by bandwidth reservation signaling on a default control channel (e.g., sending a bandwidth reservation request message and obtaining a bandwidth reservation response indicating if the bandwidth is reserved). Multiple transmissions can share the same data channel at least partially concurrently by using directional transmission to avoid interference.

Figure 2:
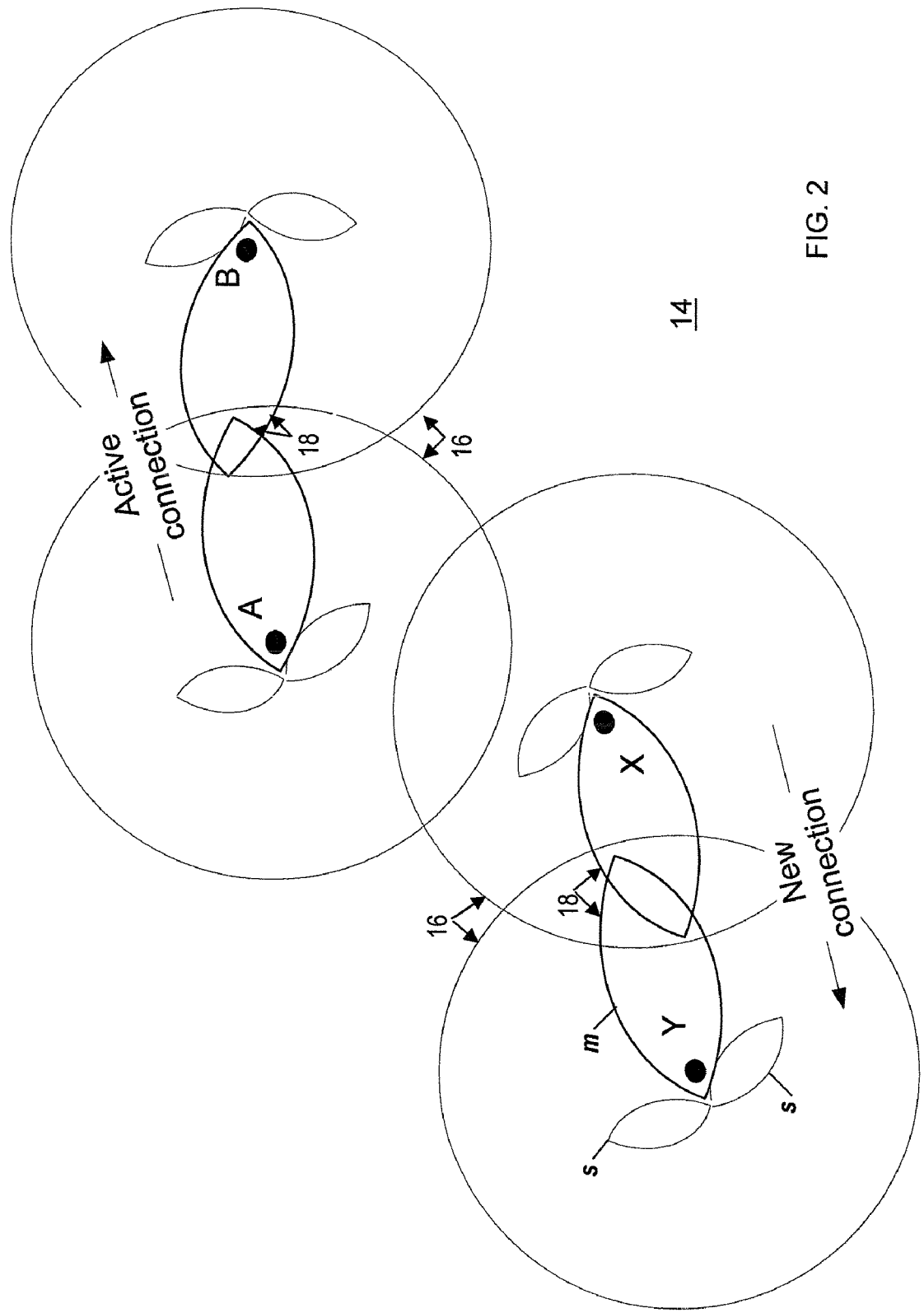
FIG. 2 shows a functional diagram of example wireless stations implementing spatial reuse by channel reuse, according to the present invention.

FIG. 2 shows an example communication configuration in a network 14 including wireless stations A, B, X and Y (e.g., stations 12 of FIG. 1), according to the present invention. The stations A, B, X and Y use a control channel 16 such as a low-rate (LR) channel (LRC), as in a 2 GHz or 5 GHz channel, for establishing a connection. Then the stations A, B, X and Y use a data channel 18, such as a high-rate channel (HRC) as in a 60 GHz channel, for data communication. In this example, stations A and B are involved in an ongoing data communication on a data channel 18 via an active (existing) connection. The stations X and Y desire to establish a new connection for new data communication on the data channel 18. If transmission from station A (transmitter (TX)) to station B (receiver (RX)) does not interfere with transmission from station X (transmitter) to station Y (receiver), then stations X and Y can at least partially concurrently use the same data channel 18 as stations A and B, for at least a portion of the new communication.

In one example, in ad hoc mode the involved stations inform each other via direct control messages (or indirectly via a coordinator in infrastructure mode) if transmission from station A to station B does not interfere with transmission from station X to station Y, such that stations X and Y can at least partially concurrently use the same data channel 18 as stations A and B, for at least a portion of the new communication.

Figure 3:
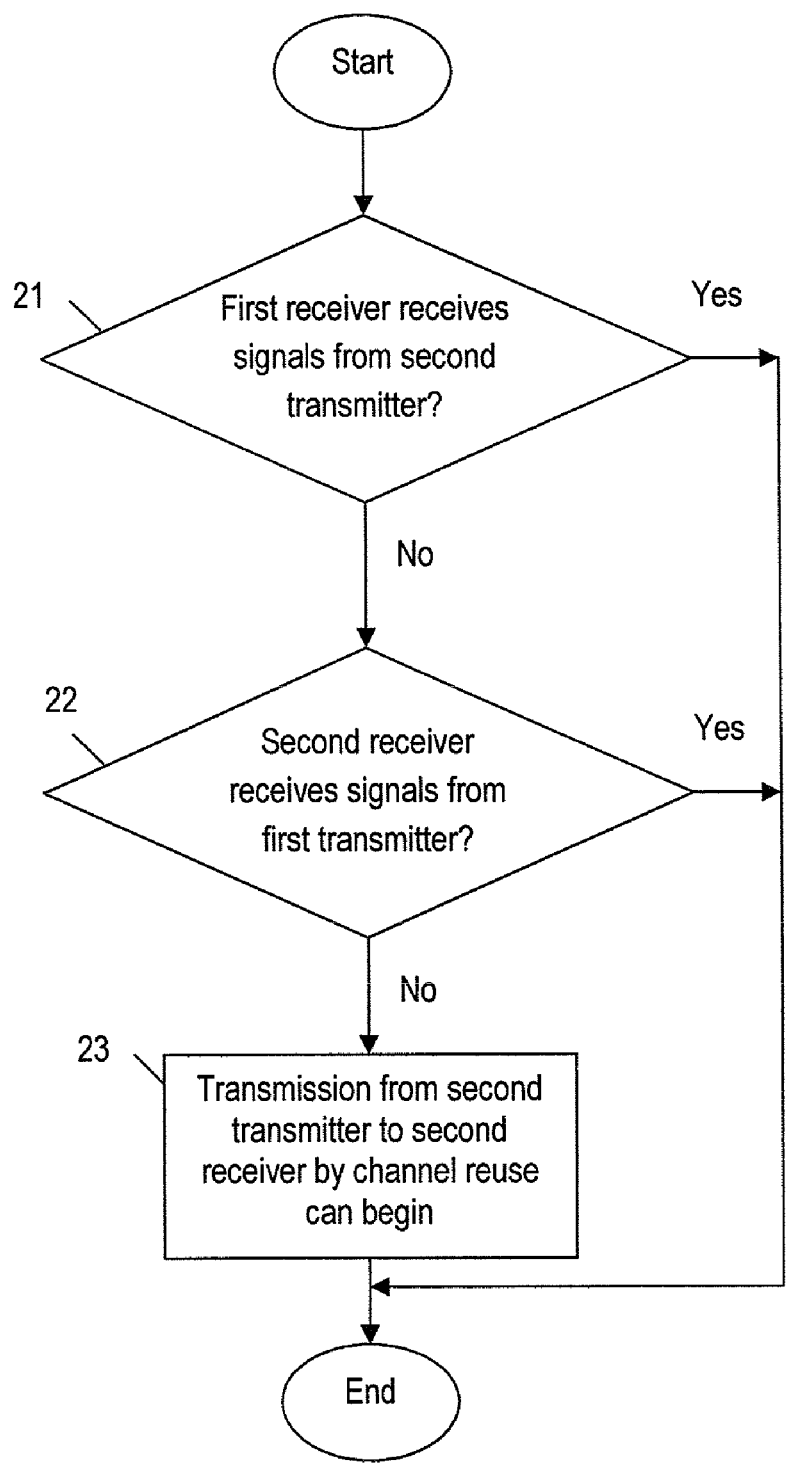
FIG. 3 shows a flowchart of the steps for an example wireless communication process utilizing spatial reuse according to the present invention.

FIG. 3 shows a flowchart of the steps for an example wireless communication process 20 utilizing spatial reuse according to the present invention. There is an ongoing data transmission (first transmission) between a first transmitter and a first receiver on the HRC, and there is a request to establish a new data transmission (second transmission) between a second transmitter and a second receiver on the HRC. The process 20 includes the following general steps:
  Step 21: Check that the first receiver does not receive LRC signals from the second transmitter.
  Step 22: Check that the second receiver does not receive LRC signals from the first transmitter.
  Step 23: New transmission from the second transmitter to the second receiver by spatial reuse can begin utilizing wireless data channel (i.e., HRC channel) reuse.

As such, steps 21 and 22 involve interference detection. In this example, if station B (first receiver) does not receive signals on channel 16 from station X (second transmitter), and if station Y (second receiver) does not receive signals on channel 16 from station A (first transmitter), then stations X and Y can begin a new communication on the same data channel 18 as the ongoing data communication between stations A and B. In FIG. 2, each directional beam on the data channel 18 comprises a main lobe m and side lobes s, and the range of omni-directional transmissions on channel 16 are shown by solid circles.

In this example, the range of HRC transmission matches with the LRC transmission, and the invention allows exploitation of spatial reuse (channel reuse) for HRC communication. As noted, data communication between the stations A and B on an HRC (channel 18) is ongoing. To establish a new connection between stations X and Y for data communication on that same HRC (channel 18), first it is determined if the LRC transmission of station X (i.e., transmission from station X on the LRC (channel 16)) does not spatially overlap with the LRC transmission of station B. This means that while station X is transmitting, station X will not cause interference at station B. Then, it is determined if the LRC transmission of station A does not spatially overlap with the LRC transmission of station Y. This means that while station A is transmitting it will not cause interference at station Y. As such, if LRC transmission from station X does not interfere with LRC transmission at station B, and LRC transmission from station A does not interfere with LRC transmission at station Y, then it is clear that the two HRC transmissions (i.e., A→B and X→Y) will not interfere with each other, and can therefore at least partially concurrently utilize the same HRC (the same data channel 18), according to an implementation of the invention. In this example, it is assumed that the HRC antenna pattern is contained within the LRC antenna pattern. Even though LRC transmissions of stations A and X can spatially overlap with each other, it is safe to have concurrent HRC transmissions A→B and X→Y since transmissions from station A are not received by station Y, and transmissions from station X are not received by station B.

There are multiple options to avoid LRC contention such as transmission from A and X. For example, communications between stations A and B (i.e., A to B and B to A) and communications between stations X and Y (i.e., X to Y and Y to X), can use different LRC channels (the HRC antenna pattern is contained within the LRC antenna pattern). In another example, a contention-based scheme can be used to avoid collisions. Yet in another example, channel time division multiple access (TDMA) or channel reservation schemes can be used to avoid collisions.

Figure 4:
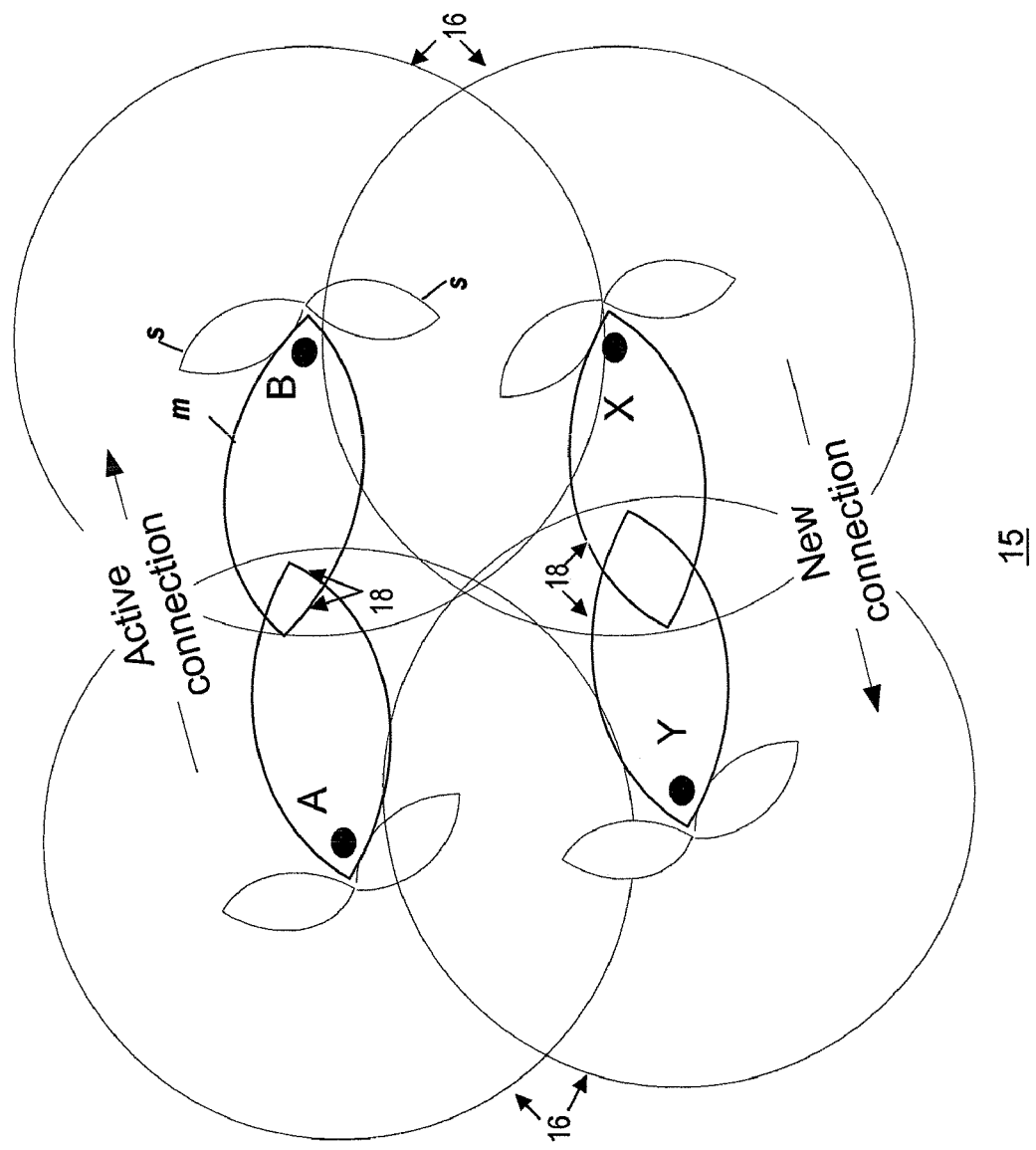
FIG. 4 shows a functional diagram of another example of wireless stations implementing spatial reuse, according to the present invention.
Figure 5:
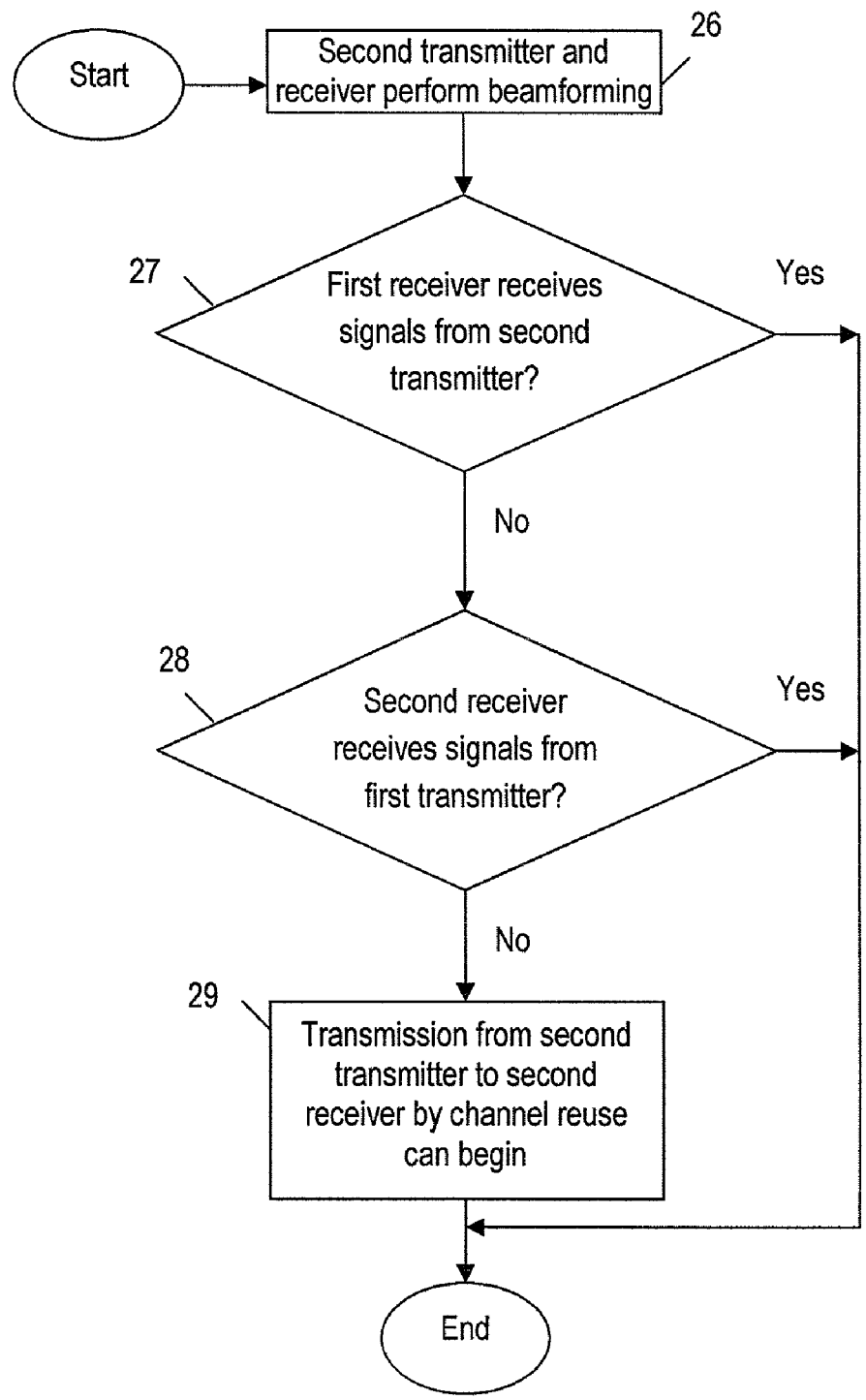
FIG. 5 shows a flowchart of the steps for another example wireless communication process utilizing spatial reuse according to the present invention.

FIG. 4 shows another example communication configuration in a network 15 including wireless stations A, B, X and Y (e.g., stations 12 of FIG. 1), according to the present invention. Again, stations A and B are involved in ongoing communication on a data channel 18, and stations X and Y desire to conduct a new connection for data communication. LRC transmissions on the control channel from each of the stations can be received by other stations, therefore in this example, a channel reuse test involves determining if HRC transmission from station A (transmitter) to station B (receiver) does not interfere with HRC transmission from station X (transmitter) to station Y (receiver), then stations X and Y can at least partially concurrently use the same data channel 18 as stations A and B, for at least a portion of the new communication. FIG. 5 shows a flowchart of the steps for an example wireless communication process 25 utilizing spatial reuse according to the present invention. There is an ongoing data transmission (first transmission) between a first transmitter and a first receiver, and there is a request to establish a new data transmission (second transmission) between a second transmitter and a second receiver. The process 25 includes the following general steps:

Step 26: The second transmitter and receiver perform beamforming towards each other for directional transmission on a data channel (HRC).
   Step 27: Check that the first receiver does not receive signals from the second transmitter on the HRC.
   Step 28: Check that the second receiver does not receive signals from the first transmitter on the HRC.
   Step 29: The second transmission from the second transmitter to the second receiver by data channel (HRC) reuse can begin.

Figure 6:
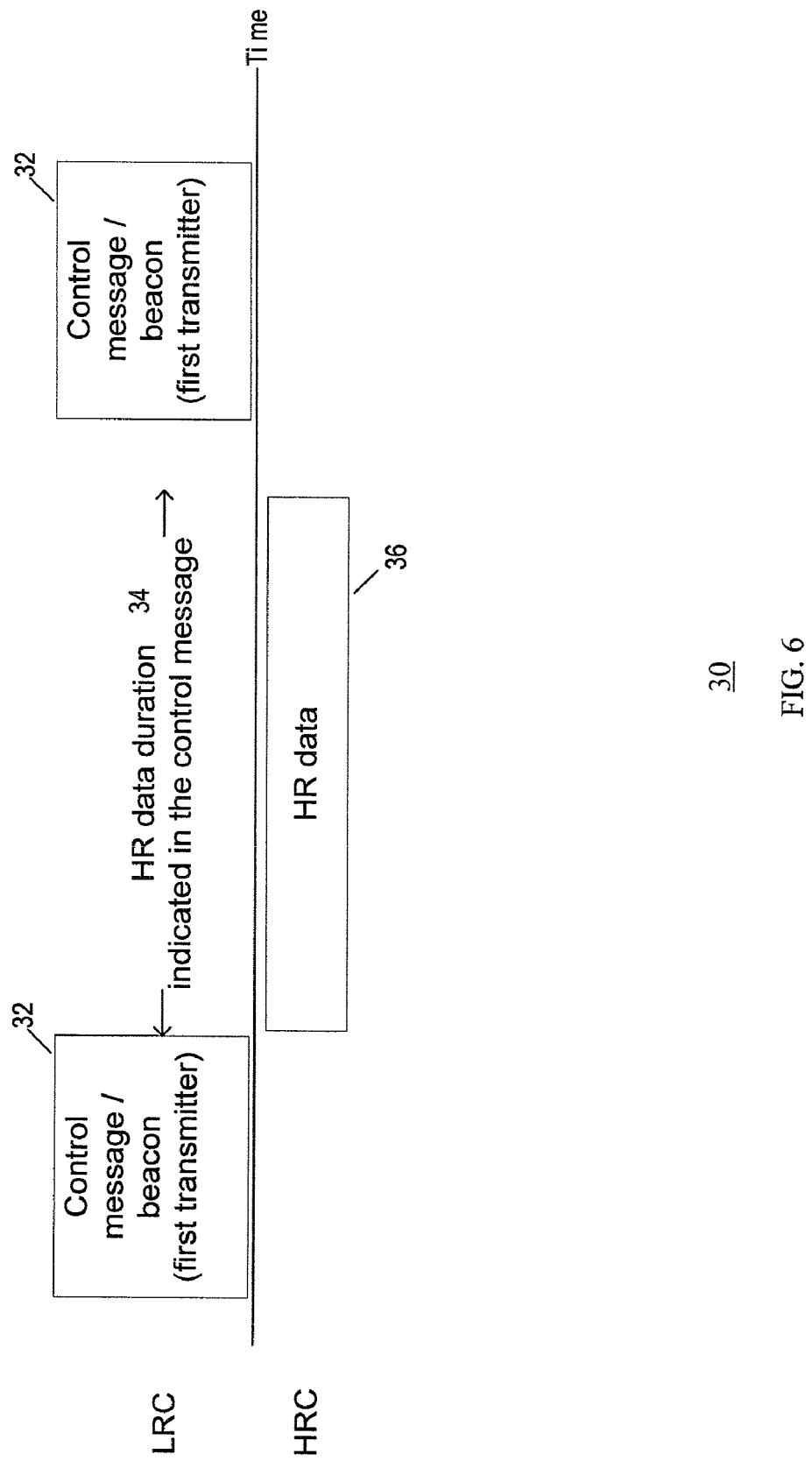
FIG. 6 shows an example of channel access for ongoing data transmission between a pair of wireless stations in FIG. 4.

While HRC transmissions from station A (first transmitter) to station B (second transmitter) are ongoing, as shown by the example channel access diagram 30 in FIG. 6, station A (and/or station B) transmits one or more LRC control messages (or beacons) 32 on the LRC channel 16 to signal other stations in the LRC communication range that the HRC channel 18 is busy. Each control message 32 may also indicate a duration of time 34, for which the HRC channel will be busy, with detailed timing information about the HRC data packet transmissions 36. Before a new transmission from station X to station Y by reusing the HRC channel can occur, the stations X and Y receive the control message from station A (and/or station B) indicating that the HRC channel is busy. The control message can also provide a schedule of the HRC transmission information station when the HRC channel is busy (the control message may also include information about the timing of the next HRC packet transmission).

Steps 27 and 28 involve interference detection. In this example, before stations X and Y can start reusing the HRC for data transmission, the stations ensure that the ongoing HRC transmission (A→B) and the new HRC transmission (X→Y), will not interfere with each other. If the result is yes (i.e., the ongoing HRC transmission (A→B) and the new HRC transmission (X→Y) will not interfere with each other), then spatial reuse can be used. As such, stations X and Y perform beamforming towards each other and then perform interference detection (steps 27 and 28). As shown by the example channel access diagram 40 in FIG. 7, such interference detection is achieved by stations X and Y exchanging beamtracking data 33 (i.e., when stations X and Y are using an antenna array to beamform towards each other, certain periods may be allocated for beam searching or antenna scanning), on a control channel which does not interfere with the control channel being currently occupied by stations A and B. If stations X and Y are using directional antennas, then beamtracking is equivalent to discovering which directional antenna to use.

Figure 7:
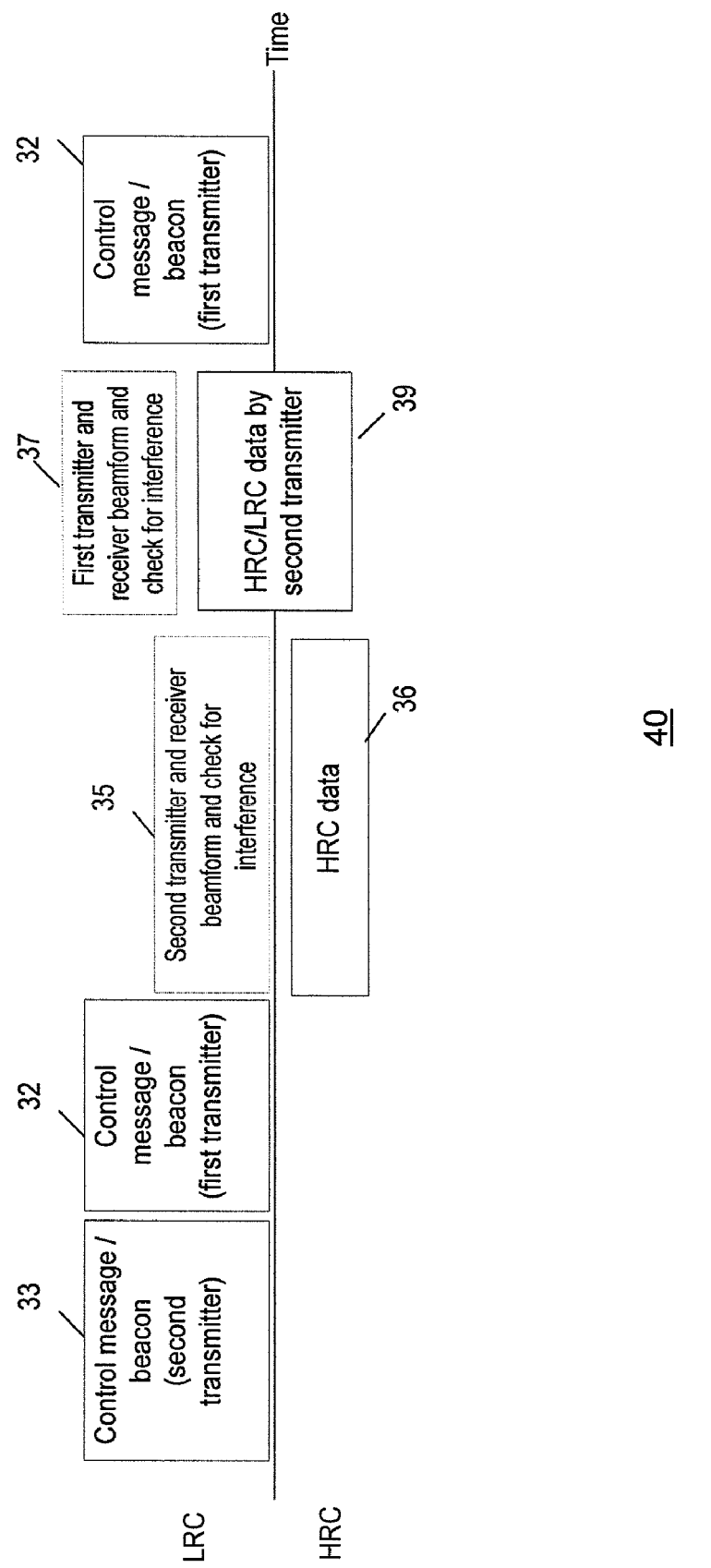
FIG. 7 shows an example diagram of channel access by spatial reuse for a new data transmission between another pair of wireless stations in FIG. 4, according to the present invention.
Figure 8:
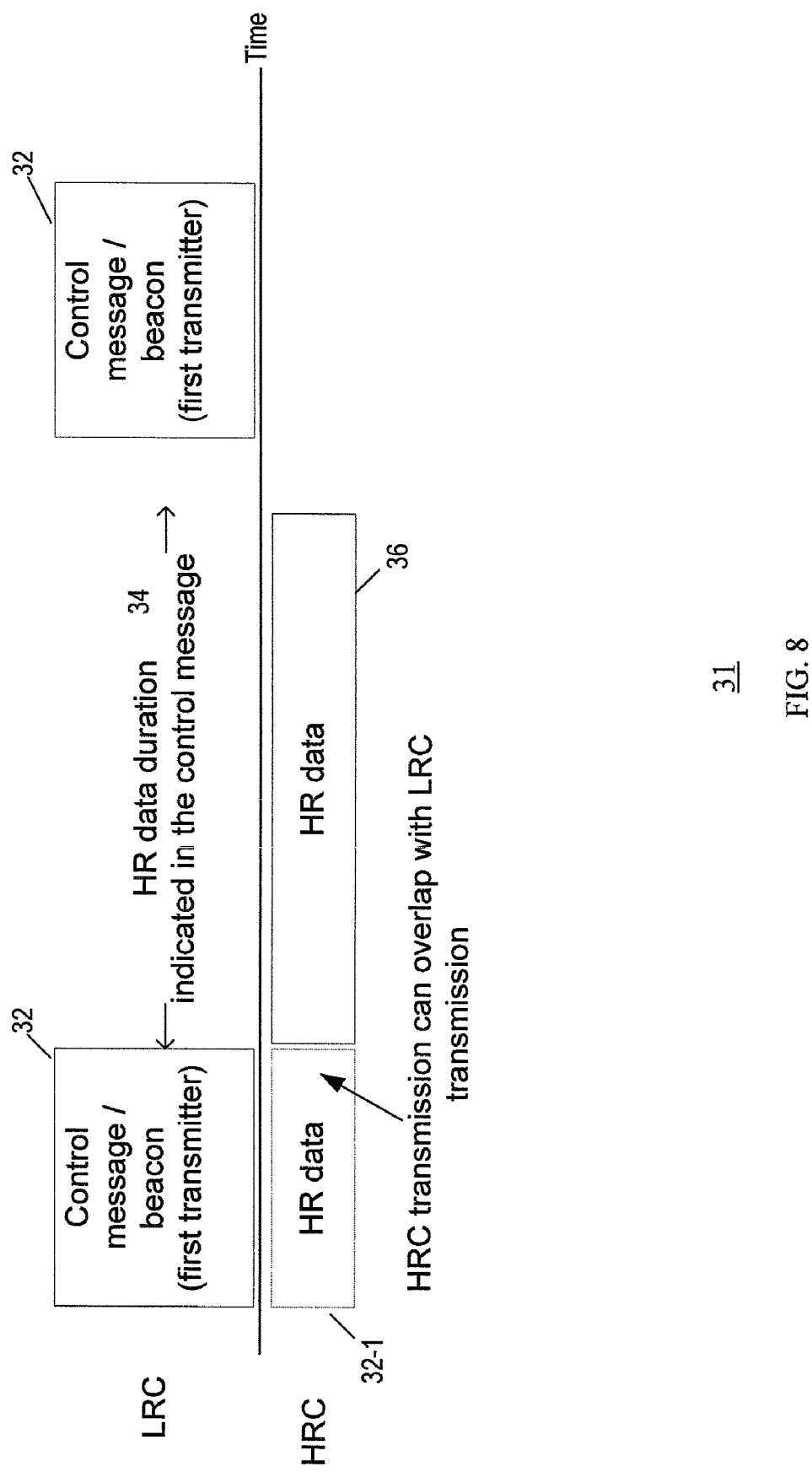
FIGS. 8 and 9 show example diagrams of FDD channel access by spatial reuse.
Figure 9:
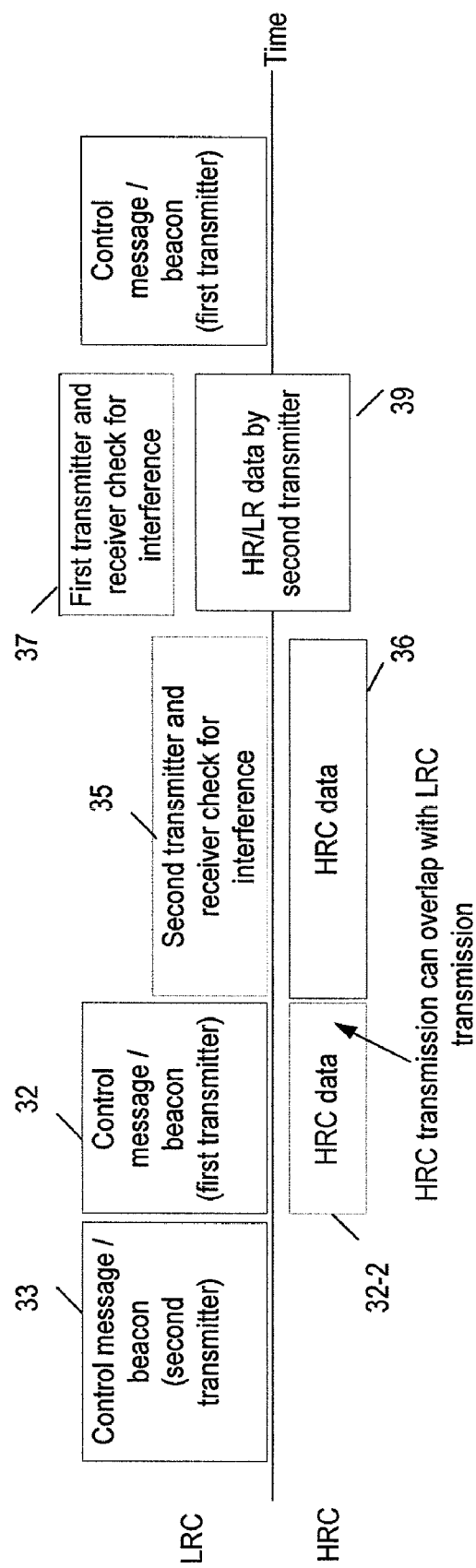

Once stations X and Y are beamformed towards each other on the HRC channel, during a first testing period 35, station Y listens on the HRC channel to determine if it can receive an HRC transmission from station A. If not, then either station X or station Y can signal stations A and B to also perform the same steps. That is while station X is transmitting to station Y, station A and station B beamform towards each other, and during a second testing period 37 station B checks if it can receive HRC transmissions from station X. If not, then stations X and Y can utilize HRC channel reuse and begin HRC transmissions that are at least partially concurrent HRC transmissions between stations A and B. As long as such concurrent HRC transmissions are active, the two pairs of stations may periodically detect interference from each other and other devices, and each pair can perform beamtracking/beamforming as needed to maintain a good connection. As shown in FIG. 7, the periods 35 and 36 can be at least partially concurrent. Further, the periods 37 and 39 can be at least partially concurrent. Other examples of channel access are also possible. For example, when frequency division duplex (FDD) channel access is used, the HRC transmission can be concurrent with LRC transmissions as shown by diagrams 31 and 41 in FIGS. 8 and 9, respectively. Specifically, FIG. 8 shows transmission of HRC data 32-1 concurrent with LRC data 32 in time, and FIG. 9 shows transmission of HRC data 32-2 concurrent with LRC data 32 in time. During the test period 39 station X transmits on the HRC data channel and stations A, B check for interference.

The above interference detection steps can also be implemented where a coordinator (e.g., DevN in FIG. 1) provides coordination functions. In that case, a TDMA-based channel access scheme (such as in IEEE 802.15.3) can be used, wherein the above interference detection steps can be facilitated by a Piconet Coordinator (PNC) for determining if a spatial reuse (channel reuse) can be utilized. TDMA allows several nodes to share the same channel frequency by dividing it into different timeslots. The nodes transmit in rapid succession, one after the other, each using its own timeslot. This allows multiple nodes to share the same channel while using only the part of the channel bandwidth they require.

Figure 10:
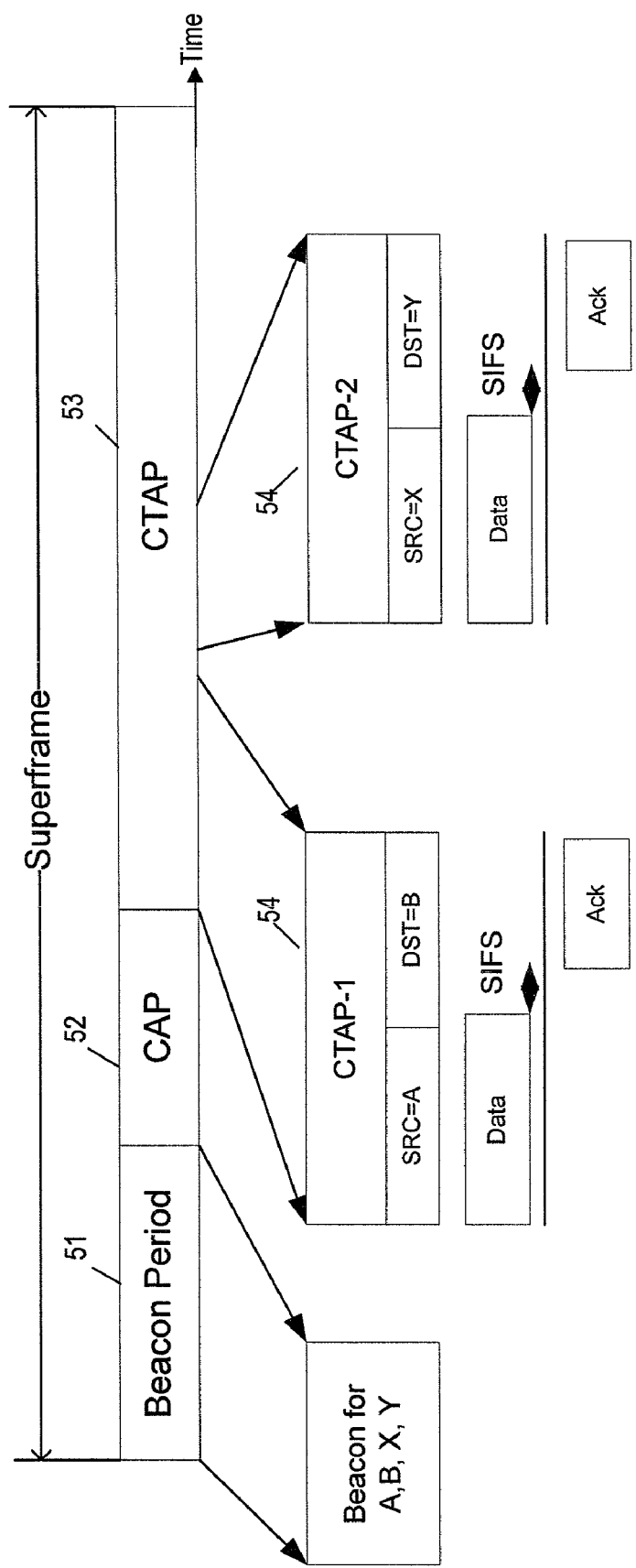
FIG. 10 shows an example superframe for facilitating spatial reuse using a coordination function that is TDMA-based, according to the present invention.

FIG. 10 shows an example superframe 50 for facilitating spatial reuse using a coordination function (such as a TDMA-based channel access managed by a coordinator) in infrastructure mode. Control messages are in the form of beacons and a bandwidth reservation scheme can be applied based on a superframe structure, wherein beacons divide the channel time into multiple superframes. Each superframe includes a beacon period 51, a contention access period (CAP) 52 and a channel time allocation period (CTAP) 53. During a beacon period 51, beacons from a coordinator station indicating channel access timing information for stations A, B, X and Y, are communicated.

Figure 11:
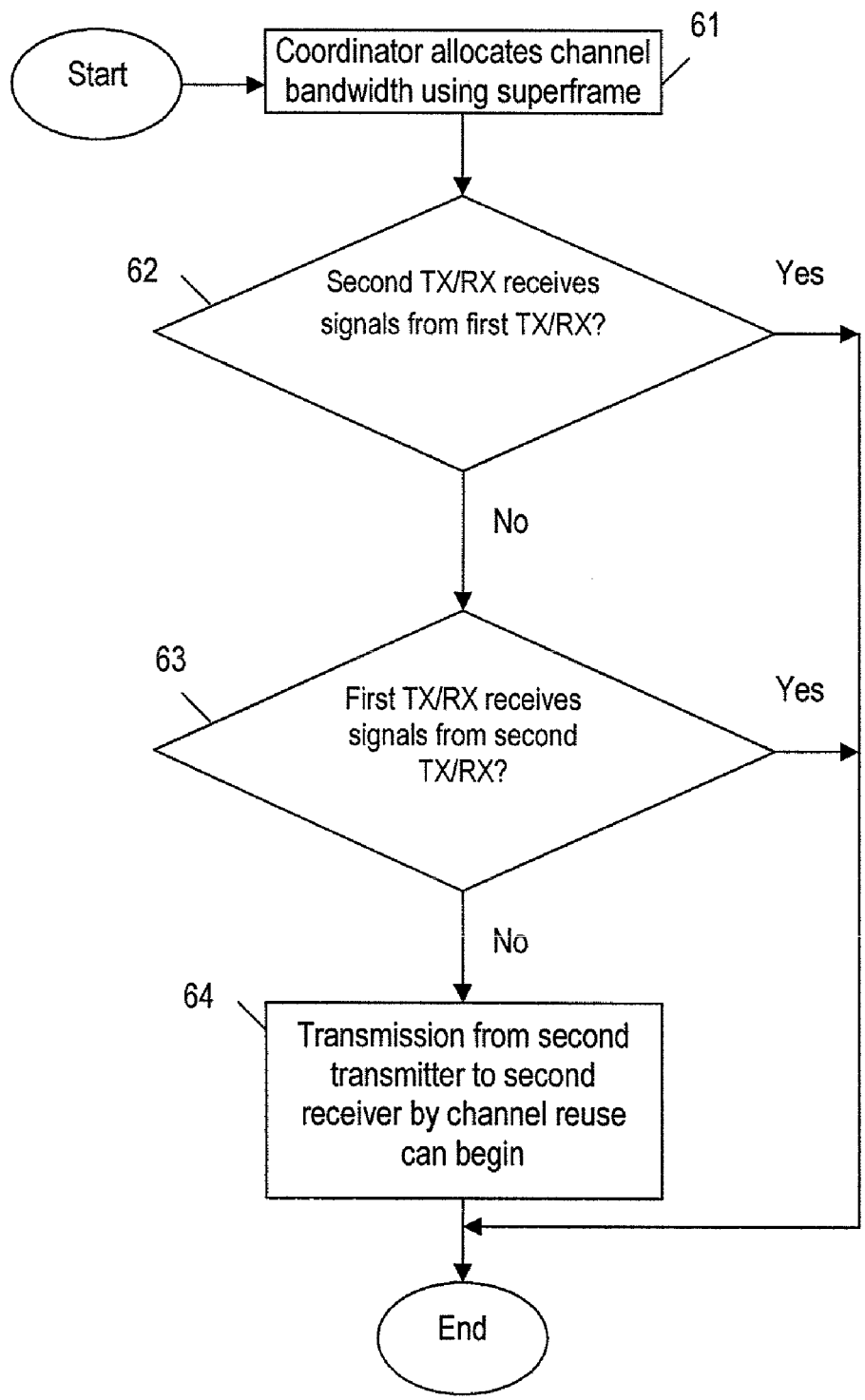
FIG. 11 shows a flowchart of the steps for another example wireless communication process for spatial reuse utilizing the superframe in FIG. 10, according to the present invention.

Each CTAP 53 includes multiple test periods 54 (e.g., CTAP-1, CTAP-2) for detecting interference. Stations A and B are involved in ongoing data transmission on the HRC and stations X and Y desire to establish a new data transmission on that HRC. Although CTAP is shown being used for testing periods, the CAP may also be used for this purpose. The CTAP-1 period is allocated to transmissions from source station A to destination station B, and includes data transmissions from station A on the HRC channel and acknowledgment from station B. During the CTAP-1 period, stations X and Y detect if they can receive transmissions between station A and station B. Similarly, during the CTAP-2 period, stations X and Y communicate on the HRC channel, and stations A and B detect if they can receive transmissions between station X and station Y. Referring to the process 60 in FIG. 11 in conjunction with FIG. 10, in step 61, the coordinator allocates HRC channel bandwidth according to the superframe 50. Then, in step 62, during CTAP-1, station A (first transmitter) transmits test directional data to station B (first receiver) on the HRC, while both X and Y listen for signals to determine if either station X or Y can detect the test HRC transmission from station A to station B (directional can be performed using a directional antenna or using a beamformed antenna array). Similarly, in step 63, during CTAP-2, station X (second transmitter) transmits test directional data to station Y (second receiver) on the HRC, while both stations A and B listen for the channel to determine if either station A or B can detect the test HRC transmission from station X to station Y. If stations X and Y cannot hear the test HRC transmissions from station A to B, and if the stations A and B cannot hear the test HRC transmissions from station X to Y, then in step 64 stations X and Y can utilize spatial reuse and begin new data transmission on the same HRC as used by stations A and B, wherein both the transmitting station A and the transmitting station X can concurrently transmit on the HRC data channel.

Assuming that the HRC antenna pattern is contained within the LRC antenna pattern, in steps 62 and 63 above, test data is first transmitted over the LRC. If both steps result in no detection, then spatial reuse is possible and the test over HRC is skipped. If steps 62 and 63 over LRC result in failure, i.e., spatial reuse is not possible, then steps 62 and 63 are executed over HRC. (Note that in the context of ad hoc mode the test is first performed over LRC (FIG. 2) and then over HRC (FIG. 4), the similar procedure is followed in the case of infrastructure mode; however, the HRC test is shown only.) Although in the above example LRC has been depicted as omni-directional, the invention is also useful in application, wherein communication on the LRC and HRC involve use of directional antenna patterns by the stations involved.

Figure 12:
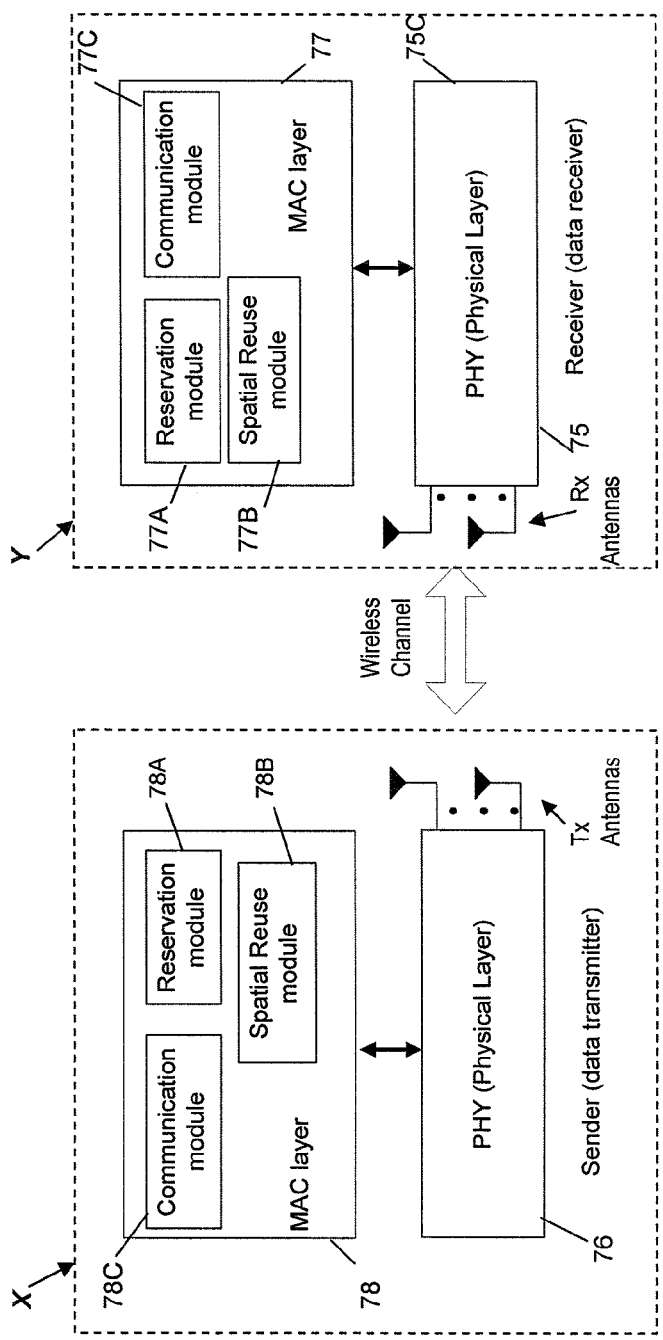
FIG. 12 shows a block diagram of architecture of wireless stations implementing spatial reuse according to an embodiment of the present invention.
Figure 12:
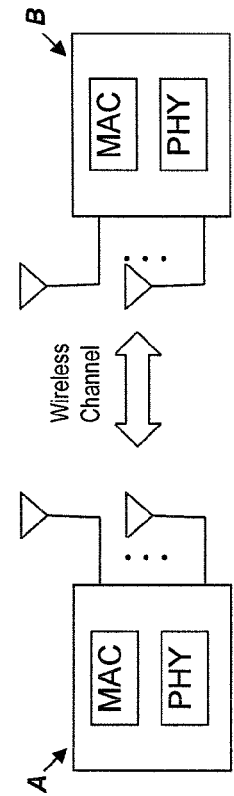

FIG. 12 shows a block diagram of an architecture for an example wireless system/network 70 implementing spatial reuse for wireless stations, according to the present invention. The network 70 includes said wireless stations A and B, and said wireless stations X and Y. The communication protocol can be an infrastructure mode or an ad hoc mode communication protocol.

In this example, station X functions as a transmitter (initiator or sender) and station Y functions as a receiver (responder). The station X includes a PHY layer 76 and a MAC layer 78. The MAC layer 78 implements a communication module 78C, a spatial reuse module 78B and may include a reservation module 78A. The station Y includes a PHY layer 75 and a MAC layer 77. The MAC layer 77 implements a communication module 77C, a spatial reuse module 77B, and may include a reservation module 77A. Each PHY layer 75, 76, may comprise one or multiple antennas.

The communication modules 77C, 78C enable the two stations X and Y to communicate over HRC and LRC channels. The stations X and Y select a data channel HRC from m channels in the, e.g., 60 GHz frequency band. Then, the spatial reuse modules 77B, 78B together implement channel reuse as discussed above (e.g., FIGS. 2-11), according to the present invention. The channel reservation modules 77A, 78A together may implement bandwidth reservation for interference detection and/or data communication on a HRC channel. The example reservation modules 77A, 78A may implement a channel bandwidth reservation using a superframe structure, wherein beacons divide the channel time into multiple superframes. In each superframe there are contention periods and contention-free periods (CFP). In each CFP there are one or more schedules, wherein each schedule includes one or more reserved channel time blocks for transmission. Stations A and B may have similar architecture as stations X and Y.

In one example, on each 60 GHz data channel, TDMA is used for different data stream transmissions. In addition, at least partially concurrent channel reuse with directional mode is provided, as described above to provide sufficient bandwidth for new transmissions. As noted, ongoing transmissions are announced by beacons on the control channel at both the sender and the receiver. A beacon can announce a schedule for one stream which can include one or multiple channel time blocks for one stream in between beacons. In each beacon for ad hoc transmission, there is a field which indicates the time left for each channel time reservation. In addition, another beacon field indicates which data channel or control channel the reservation is for. On the control channel, both a reservation-based and a contention-based channel control scheme can be used.

Concurrent, or partially concurrent, data channel reservations are made for communication between a pair of wireless stations. Time schedules are provided by beacons which include information about reserved channel time blocks for data communication. Time periods between the schedules are unreserved channel time blocks. The length of each reserved channel time block is defined in a schedule for a pair of stations. In one example, a beacon can include a bandwidth allocation information element (IE), indicating channel occupation information (e.g., a certain duration of a channel time block is reserved for communication).

The present invention is applicable to high throughput wireless communications, such as ECMA standards on millimeter wave (mm-wave) communication networks, and implementation of Wireless HD standard on uncompressed video transmission. An example implementation for a 60 GHz frequency band wireless network is described below, useful with ECMA and Wireless HD (WiHD) applications. ECMA is an international organization providing ECMA-60 GHz wireless protocol. An example implementation of the present invention for a 60 GHz frequency band wireless network can be useful with Wireless HD (WiHD) applications. Wireless HD is an industry-led effort to define a wireless digital network interface specification for wireless HD digital signal transmission on the 60 GHz frequency band, e.g., for consumer electronics (CE) and other electronic products. An example WiHD network utilizes a 60 GHz-band mmWave technology to support a physical (PHY) layer data transmission rate of multi-Gbps (gigabits per second), and can be used for transmitting uncompressed high definition television (HDTV) signals wirelessly. Another example application is for ECMA 60 GHz wireless radio standard for very high data rate short range communications (ECMA stands for European Computer Manufacturers Association, which provides international standards association for information and communication systems). The present invention is useful with other wireless communication systems as well.

As noted, a control channel (e.g., an out-of-band channel) is used for control message transmissions. This helps reduce collisions and interferences between adjacent transmissions on a data channel (in-band channel), whereby multiple streams can be essentially simultaneously transmitted on the same data channel using a directional transmission scheme. An out-of-band channel is a first physical channel that is out-of-band relative to a second physical channel (i.e., an in-band channel). The out-of-band channel is at a frequency different from an in-band channel. For example, an in-band data transmission channel may operate on a 60 GHz frequency band, whereas, an out-of-band channel may operate on a 5 GHz or 2.4 GHz (or even another 60 GHz) frequency band. Out-of-band frequency means a different frequency than in-band frequency, even if both are in the same frequency band. In an ad hoc mode wireless communication process, each wireless client in a network forwards data for other wireless clients as determined based on the network connectivity, by using control channels for communicating control information messages to facilitate communication on a data channel.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of establishing wireless communication between a first transmitter and a first receiver on the same wireless data channel used for ongoing transmission between a second transmitter and a second receiver, comprising:
   performing interference detection including: determining if the second receiver can receive signals from the first transmitter, determining if the first receiver can receive signals from the second transmitter, and transmitting a control message on a control channel to signal other stations in range that the data channel is in use by the second transmitter and the second receiver;
   upon the first transmitter and second transmitter being beamformed towards each other on the data channel, during a first testing period if the first receiver cannot receive data transmissions from the second transmitter, then signaling the second transmitter and the second receiver to also perform interference detection during a second testing period
   if the second receiver cannot receive signals from the first transmitter, and the first receiver cannot receive signals from the second transmitter, indicating no interference, then establishing a new transmission from the first transmitter to the first receiver by spatial reuse of the wireless data channel; and
   upon receiving the control message, the first transmitter and the first receiver exchanging beamtracking data on the control channel which does not interfere with the control channel being currently occupied by the second transmitter and the second receiver, for beamforming on said data channel,
   wherein the new transmission on said data channel is at least partially concurrent with said ongoing transmission on said data channel.

2. The method of claim 1, wherein determining if the second receiver can receive signals from the first transmitter includes determining if the second receiver can receive signals from the first transmitter on a wireless control channel.

3. The method of claim 2, wherein determining if the first receiver can receive signals from the second transmitter includes determining if the first receiver can receive signals from the second transmitter on a wireless control channel.

4. The method of claim 3, wherein the control channel signals have essentially the same range as the data channel signals.

5. The method of claim 1, wherein the data channel comprises a 60 GHz frequency band wireless channel.

6. The method of claim 1, wherein:
   determining if the second receiver can receive signals from the first transmitter includes determining if the second receiver can receive signals from the first transmitter on the data channel; and
   determining if the first receiver can receive signals from the second transmitter includes determining if the first receiver can receive signals from the second transmitter on the data channel.

7. The method of claim 6, wherein:
   determining if the second receiver can receive signals from the first transmitter on the data channel includes determining if the second receiver can receive directional signals from the first transmitter on the data channel; and
   determining if the first receiver can receive signals from the second transmitter on the data channel includes determining if the first receiver can receive directional signals from the second transmitter on the data channel.

8. The method of claim 6, wherein:
   determining if the second receiver can receive signals from the first transmitter on the data channel includes determining if the second receiver can receive beamformed signals from the first transmitter on the data channel; and
   determining if the first receiver can receive signals from the second transmitter on the data channel includes determining if the first receiver can receive beamformed signals from the second transmitter on the data channel.

9. The method of claim 1, wherein the new transmission between the first transmitter and the first receiver is established in ad hoc mode.

10. The method of claim 1, wherein performing interference detection further includes:
   during the second testing period the second transmitter and the second receiver exchanging beamtracking data on a control channel which does not interfere with the control channel being currently occupied by the first transmitter and the first receiver;
   such that if during the first testing period the first receiver cannot receive signals from the second transmitter during the first testing period, and if during the second testing period the second receiver cannot receive signals from the first transmitter, indicating no interference, then establishing a new transmission from the first transmitter to the first receiver by spatial reuse of the wireless data channel;
   wherein the new transmission on said data channel is at least partially concurrent with said ongoing transmission on said data channel.

11. The method of claim 10, wherein transmissions on the data channel and the control channel overlap.

12. The method of claim 10, wherein exchanging beamtracking data involves using directional antennas.

13. The method of claim 10, wherein exchanging beamtracking data involves using an antenna array to beamform during a testing period allocated for beamsearching or antenna scanning.

14. The method of claim 1, wherein the new transmission between the first transmitter and first receiver is established in infrastructure mode using a coordination function.

15. The method of claim 14, wherein performing interference detection further includes:
- a coordinator allocating test periods during a contention access period or a channel time allocation period;
- during a first test period, transmitting first test directional data from the second transmitter to the second receiver on the data channel while determining if the first transmitter and/or the first receiver can detect the test data; and
- during a second test period, transmitting second test directional data from the first transmitter to the first receiver on the data channel while determining if the second transmitter and/or the second receiver can detect the second test data.

16. A wireless communication station, comprising:
- a communication module for communication on wireless channels; and
- a spatial reuse module configured for establishing wireless communication with a wireless receiving station on the same wireless data channel used for ongoing transmission between a transmitter and a receiver; and
- upon receiving a control message, the wireless communication station and the receiving station exchanging beamtracking data on a control channel which does not interfere with the control channel being currently occupied by the transmitter and the receiver, for beamforming on said data channel, and upon a transmitter of the communication station and the transmitter being beamformed towards each other on the data channel, during a first testing period if the wireless receiving station cannot receive data transmissions from the transmitter, then signaling the transmitter and the receiver to also perform interference detection during a second testing period,
- such that the spatial reuse module determines if the receiver can receive signals from the communication module of the wireless communication station, wherein if the receiver cannot receive signals from the wireless communication station and if the wireless receiving station cannot receive signals from the transmitter, then the spatial reuse module establishes a new transmission between the wireless communication station and the wireless receiving station by spatial reuse of the data channel via the communication module;
- wherein the new transmission on said data channel is at least partially concurrent with said ongoing transmission on said data channel.

17. The wireless communication station of claim 16, wherein the spatial reuse module is configured to determine if the receiver can receive signals from the communication module on a wireless control channel at a specific time period.

18. The wireless communication station of claim 17, wherein the control channel signals have essentially the same range as the data channel signals.

19. The wireless communication station of claim 17, wherein the data channel comprises a 60 GHz frequency band wireless channel.

20. The wireless communication station of claim 16, wherein the spatial reuse module is configured to determine if the receiver can receive directional or beamformed signals from the communication module on the data channel at a specific time period.

21. The wireless communication station of claim 16, wherein the new transmission is established in ad hoc mode.

22. The wireless communication station of claim 16, wherein the new transmission is established in infrastructure mode using a coordination function.

23. The wireless station of claim 16, wherein if during the second testing period the first receiver cannot receive data channel transmissions from the second transmitter, then the second transmitter and the second receiver reuse the data channel.

24. The wireless station of claim 23, wherein the second transmitter and the second receiver communicate transmissions that are at least partially concurrent data channel transmissions between the first transmitter and the first receiver.

25. A wireless communication station, comprising:
- a communication module for communication on wireless channels;
- a spatial reuse module configured for establishing wireless communication with a wireless transmitting station on the same wireless data channel used for ongoing transmission between a transmitter and a receiver, upon receiving a control message, the wireless communication station and the transmitting station exchanging beamtracking data on a control channel which does not interfere with the control channel being currently occupied by the transmitter and the receiver, for beamforming on said data channel, the spatial reuse module transmits a control message on the control channel to signal other stations in range that the data channel is in use by the transmitter and the receiver,
- upon the wireless communication station and the transmitter being beamformed towards each other on the data channel during a first testing period if the wireless communication station cannot receive data transmissions from the transmitter, then the spatial reuse module being configured for signaling the transmitter and the receiver to also perform interference detection during a second testing period
- such that the spatial reuse module determines if the communication module of the wireless communication station can receive signals from the transmitter, wherein if the communication module cannot receive signals from the transmitter and if the receiver cannot receive signals from the wireless transmitting station, then the spatial reuse module establishes a new transmission between the wireless communication station and the wireless transmitting station by spatial reuse of the data channel via the communication module,
- wherein the new transmission on said data channel is at least partially concurrent with said ongoing transmission on said data channel.

26. The wireless communication station of claim 25, wherein the spatial reuse module is configured to determine if the communication module of the wireless communication station can receive signals from the transmitter on a wireless control channel.

27. The wireless communication station of claim 26, wherein the control channel signals have essentially the same range as the data channel signals.

28. The wireless communication station of claim 27, wherein the data channel comprises a 60 GHz frequency band wireless channel.

29. The wireless communication station of claim 28, wherein the spatial reuse module is configured to determine if the communication module of the wireless communication station can receive directional or beamformed signals from the communication module on the data channel.

30. The wireless communication station of claim 27, wherein the new transmission is established in ad hoc mode.

31. The wireless communication station of claim 27, wherein the new transmission is established in infrastructure mode using a coordination function.

32. A wireless communication system comprising:
   a first communication station and a second communication station;
   the first wireless communication station comprising:
      a first communication module for communication on wireless channels; and
      a first spatial reuse module configured for establishing wireless communication with the second communication station on the same wireless data channel used for ongoing transmission between a transmitter and a receiver, such that the first spatial reuse module determines if the receiver can receive signals from the first communication module; and
   the second wireless communication station comprising:
      a second communication module for communication on wireless channels; and
      a second spatial reuse module configured for establishing wireless communication with a wireless transmitting station on the same wireless data channel used for ongoing transmission between a transmitter and a receiver, such that the second spatial reuse module determines if the second communication module can receive signals from the transmitter;
   wherein during a beacon period, a beacon from a coordinator provides channel access timing information to the first communication module and the second communication module, such that if the receiver cannot receive signals from the first communication module and if the second communication module cannot receive signals from the transmitter, the first spatial reuse module establishes a new transmission between the first wireless communication station and the second wireless communication station by spatial reuse of the data channel via the first communication module, and the second spatial reuse module accepts the new transmission between the first wireless communication station and the second wireless communication station by spatial reuse of the data channel via the second communication module,
      wherein upon the first communication station and the transmitter being beamformed towards each other on the data channel, during a first testing period if the second communication station cannot receive data transmissions from the transmitter, then signaling the transmitter and the receiver to also perform interference detection during a second testing period,
      wherein the new transmission on said data channel is at least partially concurrent with said ongoing transmission on said data channel.

33. A method of establishing wireless communication between a first transmitter and a first receiver on the same wireless data channel used for ongoing transmission between a second transmitter and a second receiver, comprising the steps of:
   performing interference detection including: determining if the second receiver can receive signals from the first transmitter, and determining if the first receiver can receive signals from the second transmitter;
   if the second receiver cannot receive signals from the first transmitter, and the first receiver cannot receive signals from the second transmitter, indicating no interference, then establishing a new transmission from the first transmitter to the first receiver by spatial reuse of the wireless data channel; and
   during a beacon period, a beacon from a coordinator provides channel access timing information for the first transmitter and the first receiver, and the second transmitter and the second receiver,
   wherein the new transmission on said data channel is at least partially concurrent with said ongoing transmission on said data channel,
   wherein upon the first transmitter and second transmitter being beamformed towards each other on the data channel, during a first testing period if the first receiver cannot receive data transmissions from the second transmitter, then signaling the second transmitter and the second receiver to also perform interference detection during a second testing period.

* * * * *